United States Patent [19]

Perez

[11] Patent Number: 5,154,721
[45] Date of Patent: Oct. 13, 1992

[54] APPARATUS FOR FIXING IDENTIFICATION TAGS ON ANIMALS

[76] Inventor: Francisco S. Perez, c/Campmany No 63, 08301, Mataro, (Barcelona), Spain

[21] Appl. No.: 572,577

[22] Filed: Aug. 27, 1990

[30] Foreign Application Priority Data

Aug. 28, 1989 [ES] Spain ............................... 8902676[U]

[51] Int. Cl.⁵ ............................................. A01K 11/00
[52] U.S. Cl. .................................. 606/117; 606/205; 81/352; 81/353
[58] Field of Search ................. 81/300, 304, 306, 321, 81/322, 323, 346, 350, 351, 352, 355, 313, 314, 353, 354; 606/117, 205–209

[56] References Cited

U.S. PATENT DOCUMENTS 1,834,266 12/1931 Bohner ................................ 81/300

FOREIGN PATENT DOCUMENTS 1205018 1/1960 France ................................. 81/353
747508 4/1956 United Kingdom .................. 81/352
2119319 11/1983 United Kingdom ................. 606/117

Primary Examiner—Stephen C. Pellegrino
Assistant Examiner—Glenn K. Dawson
Attorney, Agent, or Firm—Venable, Baetjer and Howard

[57] ABSTRACT

Apparatus for fixing identification tags on animals, composed of two symmetric parallel sections, each of which has, in its central part, a gap, both sections being connected to each other by means of rectangular metal strips that have the same form, overlapping and crosswise to each other, these being connected by a pin which carries a spring the ends of which are fixed to pins which connect the metal strip to the corresponding section of the apparatus in a rotatable manner, mentioned metal strips having, at their opposite ends, "L"-shaped gaps which have pins perpendicular to the sides of the corresponding section, that go through mentioned sides, and are fixed to the sides in such a manner as to, when the two sections close upon closing the handle ends of the apparatus, the tag is closed, at which instant the corresponding pins reach the juncture of the two sides of the "L"-shaped gap, the pin afterwards proceeding up the shorter leg of the "L"-shaped gap as pressure is maintained on the handles, resulting in the pincer end of the apparatus to open and facilitate the removal of the tag while the handle ends remain closed.

4 Claims, 3 Drawing Sheets

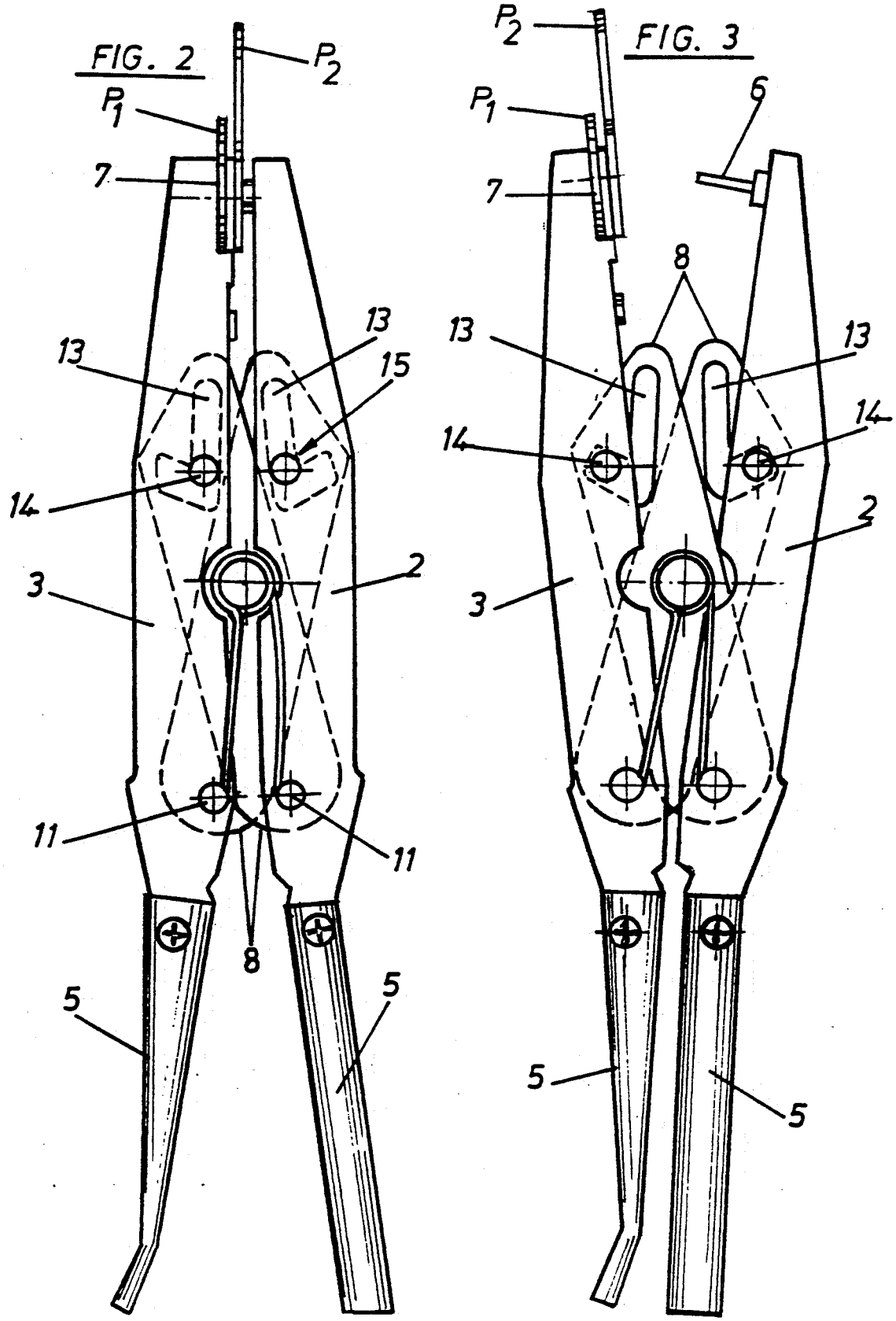

5,154,721

APPARATUS FOR FIXING IDENTIFICATION TAGS ON ANIMALS

BACKGROUND OF THE INVENTION

The present invention refers to an apparatus for fixing identification tags on animals.

This apparatus is of the pincer type, which carry means for placing the tag on one side and fixing said tag on the ear of the animal, said tag carrying any characteristic or numbering which corresponds to the animal.

Apparatus of this type and for the same purpose are already known, with variations being in their characteristics of construction although all of them, once the tag is fixed, have the section (which originally carried the tag) in a fixed position such that, in order to remove the apparatus, one has to effect the operations of first opening the the apparatus and then separating same from the tag.

The apparatus of this invention does away with this problem given that, once the tag is fixed and closed on the ear of the animal, the apparatus remains open due to the manner in which it is constructed.

SUMMARY OF THE INVENTION

The apparatus of this invention, which is of the pincer type, is composed of two sections or "arms" which have, in their central part, a longitudinal gaps, mentioned gaps being connected to each other by metal strips crosswise to each other and interconnected to each other in an overlapping position by a pin situated in their center, one end of each strip on the same side close to the handle of the apparatus, rotating on their axis within the gap due to having corresponding fixed axis of rotation, while the two other opposed ends have, at their extremities, a channel or cut that is "L"-shaped, the internal angle of which is a right angle while the external part is rounded.

Each of the "L"-shaped channels has a pin which is located so that, upon rotation of the strips, said strips travel along the longer section of the corresponding "L"-shaped gap with the help of the pin and also the tension of a spring mounted on the central pin of the strips and their rotating ends priorly mentioned.

When both pins of the "L"-shaped gap are at the juncture of the two legs of the "L", the tag closes and is fixed, and the pins travel to the other or shorter leg of the "L"-shaped gap, resulting in the opening of the taging end of the apparatus while its opposite ends, corresponding to the handle, remain closed.

BRIEF DESCRIPTION OF THE DRAWINGS

In order to better understand not only the construction of the apparatus of this invention, but also how same operates, following is an example of a possible modality of the apparatus, however understanding that this is simply an example and should in no manner serve as a limitation of the invention, the example corresponding to the enclosed drawings in which:

FIG. 2 is a side view of the apparatus in a closed position, consequently with both sections of the tag united.

FIG. 3 is a view of the apparatus similar to that of FIG. 2, but with the front end in an open position and the tag already closed.

DETAILED DESCRIPTION OF THE PREFERRED EMBODIMENT

Figure 1:
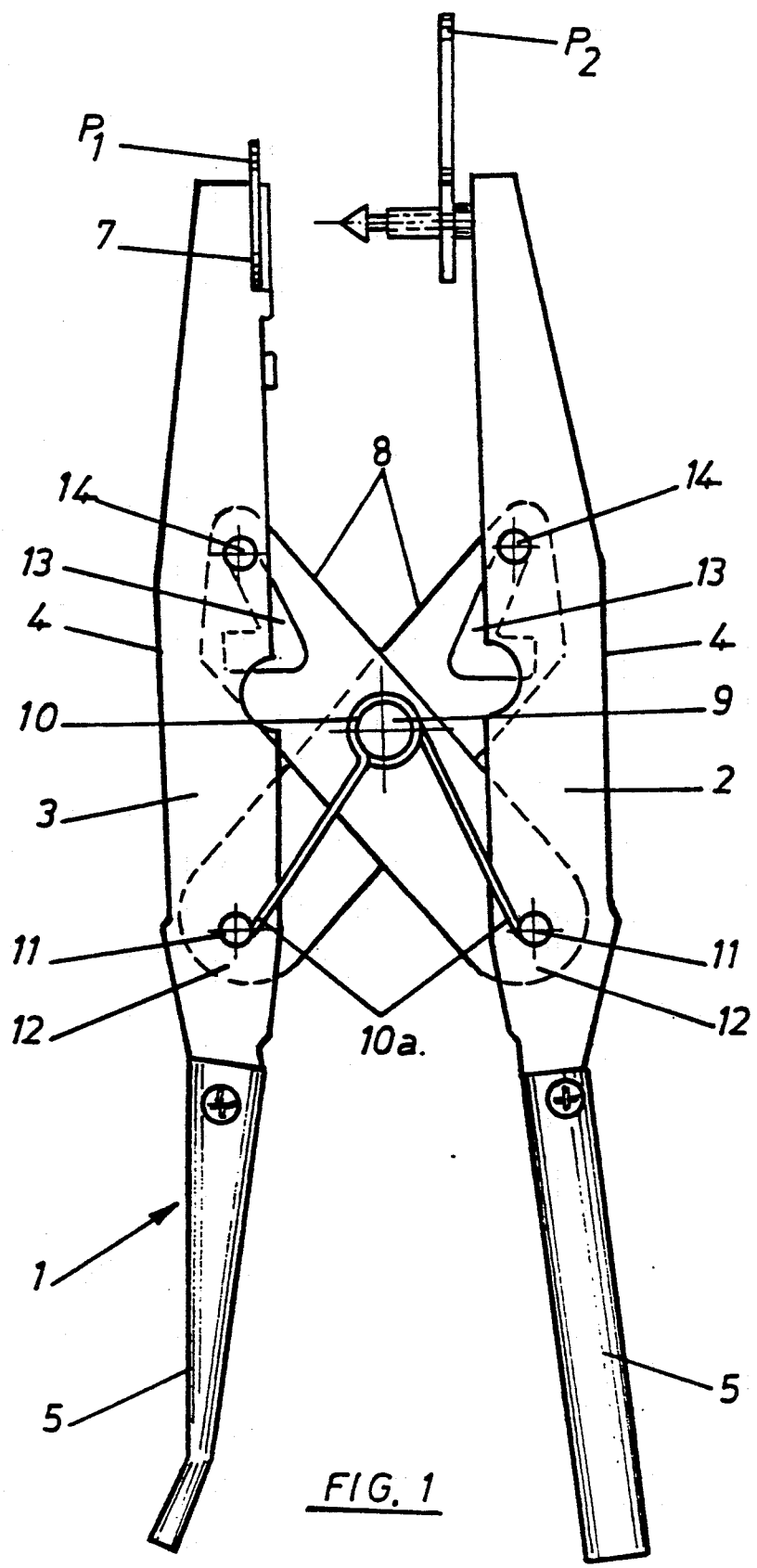
FIG. 1 is a top view of the apparatus in an open position, with the tag naturally still being divided in 2 sections or parts.
Figure 4:
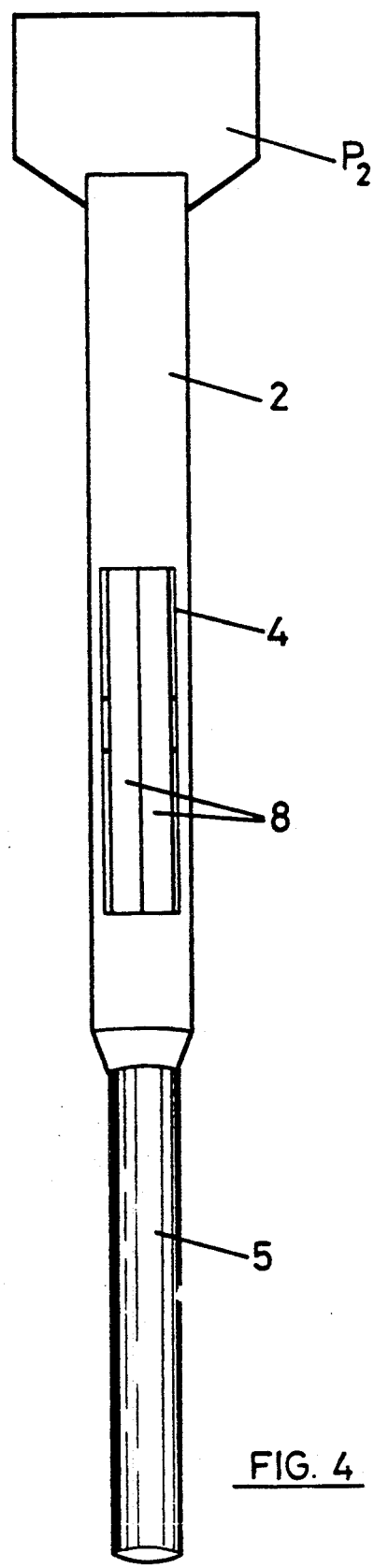
FIG. 4 is a side view of the apparatus depicted in FIGS. 1-3.

The apparatus 1 shown in all the figures is of the pincer type, composed of two sections 2 and 3, each of which has a gap 4 in its central section, both gaps facing each other, while each section has, at one end, a handle 5.

Section 2 has a protrusion or projection 6 in its front end while section 3 has, in the same extremity, an indenture 7 in which one section of the tag $P_1$ is placed, while the other section $P_2$ of the tag is placed on protrusion 6.

Sections 2 and 3 are connected by two rectangular metal strips 8. The strips 8 are provided with the same configuration and are situated such that one of the strips overlies the other in a crosswise orientation. The strips are connected to one another at their center by means of a pin/center of rotation 9 on which a spring 10 is mounted, the ends 10a of which are fixed to pins 11 which serve as pivoting points for the ends 12 of each metal strip with regard to corresponding sections 2 and 3. In like manner, each metal strip has, at its opposite end, an "L"-shaped slot 13 which allows the connection of each metal strip 8 with a pin 14 which is fixedly mounted on on each section 2 and 3.

Upon closing the apparatus, with the corresponding fixing of the tag (see FIG. 2) each metal strip 8 is advanced along its corresponding longitudinal part of the slot 13. Each of the slots 13 has its angle 15 facing the corresponding pin 14. From this moment onward, and upon continued application of pressure on the handle, the metal strips 8 rotate and the pins 14 travel along towards the end of the shorter leg of the "L"-shaped slot 13, at which time the apparatus takes the position shown in FIG. 3, i.e., open position but with the handle end closed, which facilitates removal of the assembled tag from the tip of the apparatus.

The nature of the invention, as well as the manner in which to realize same, it should be noted that the modalities priorly explained and shown in the drawings are subject to modifications as long as the basic principles of the invention are not altered.

I claim:

1. An apparatus for fixing onto animals tags having a first part engageable with a second part, the apparatus comprising:

a pair of generally symmetrical handle sections arranged generally parallel to one another, each of said handle sections defining a recess at a generally central portion thereof, said handle sections being connected to one another by a pair of generally rectangular overlapping crossmembers, said crossmembers being pivotally mounted to one another at a pivot formed at a generally intermediate position thereof and being coupled to a corresponding one of said handle sections at a lower end of said crossmembers by a fastener; and spring biasing means extending from said fasteners and being coupled to said crossmember pivot so as to resist movement of the lower ends of said crossmembers toward one another, each of said crossmembers being provided at an upper end thereof with a generally L-shaped slot formed therein comprising first and second legs connected at a common juncture, an upper end of each of said handle section including slot follower means extending through a corresponding one of said slots and being operable such that, upon advancement of a lower end of the handle sections toward one another, corresponding parts of a tag respectively mounted to said handle sections at a free end thereof are superposed, said slot being advanced along said slot follower from the first leg thereof to said juncture, further advancement of said handle sections being operable to advance the second leg of each of said slots along said corresponding slot follower and displace said handle section free ends away from one another.

2. The apparatus according to claim 1, wherein the free end of one of said handle sections is provided with an indenture and the free end of the other of said handle sections is provided with a protrusion.

3. The apparatus according to claim 2, wherein said indenture is configured to receive therein at least a portion of said protrusion.

4. The apparatus according to claim 1, wherein at least said apparatus crossmembers are formed from metal.

* * * * *